United States Patent
Lyons

(10) Patent No.: US 7,165,250 B2
(45) Date of Patent: Jan. 16, 2007

(54) SYSTEM AND METHOD FOR PRIORITY BASED APPLICATION SERVER UPDATES

(75) Inventor: Peter K. Lyons, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 10/044,915

(22) Filed: Jan. 15, 2002

(65) Prior Publication Data

US 2003/0135536 A1    Jul. 17, 2003

(51) Int. Cl.
*G06F 9/445* (2006.01)
(52) U.S. Cl. .................. 717/177; 717/174; 718/103; 718/100
(58) Field of Classification Search ........ 717/168–173; 718/1, 100–108
See application file for complete search history.

(56) References Cited

U.S. PATENT DOCUMENTS

| | | | | |
|---|---|---|---|---|
| 5,155,847 A | * | 10/1992 | Kirouac et al. | 709/221 |
| 5,247,683 A | * | 9/1993 | Holmes et al. | 709/221 |
| 5,682,533 A | * | 10/1997 | Siljestroemer | 707/200 |
| 5,896,566 A | * | 4/1999 | Averbuch et al. | 455/419 |
| 5,909,581 A | * | 6/1999 | Park | 717/170 |
| 6,009,274 A | * | 12/1999 | Fletcher et al. | 717/173 |
| 6,324,691 B1 | * | 11/2001 | Gazdik | 717/178 |
| 6,678,888 B1 | * | 1/2004 | Sakanishi | 717/172 |
| 6,681,389 B1 | * | 1/2004 | Engel et al. | 717/173 |
| 2004/0215755 A1 | * | 10/2004 | O'Neill | 709/223 |

* cited by examiner

Primary Examiner—Lewis A. Bullock, Jr.
(74) Attorney, Agent, or Firm—Pillsbury Winthrop Shaw Pittman, LLP

(57) ABSTRACT

The invention provides a system and method for updating applications without the need to interrupt server operation. The system may include an update deployer that functions as a main execution engine and is responsible for coordinating updates with an application server.

21 Claims, 2 Drawing Sheets

US 7,165,250 B2

SYSTEM AND METHOD FOR PRIORITY BASED APPLICATION SERVER UPDATES

FIELD OF THE INVENTION

This invention is a system and method for updating applications on a running application server without requiring a server restart.

BACKGROUND OF THE INVENTION

As used herein, the term application is used to refer to a set of files that are useable in a processor based environment. In a network environment, an environment of a several processors in communication with one another, it is often difficult and inconvenient to update an application.

Typically, the process to update an application entails at least three steps: first, the network file server must be shut down, second, the application files are updated, and finally, the server must be restarted. One drawback this typical process is that for the period of time it takes to update the application, the server, and all other applications that reside on the server, are inaccessible to network clients.

Another drawback of existing application update mechanisms is that they often must be scheduled to occur at inconvenient times for network administrators. Because they entail a service interruption, most application updates are scheduled to take place at off peak hours (e.g., after midnight). This can be inconvenient and stressful for the personnel responsible for administering the updates.

Another drawback of existing application update mechanisms is that they require personnel to oversee the update. For example, an administrator must be present to shut down the server, ensure that the appropriate files are updated and restart the server.

Other drawbacks of current application update systems also exist.

SUMMARY OF THE INVENTION

The present invention provides a system and method for updating applications without the need to interrupt server operation. The system may comprise an update deployer that functions as a main execution engine and is responsible for coordinating updates with an application server.

One advantage of the present invention is that it enables application updates with less server down time and a reduced amount of administrative work. According to some embodiments, a method for updating an application server may comprise configuring the deployer and enabling it to update the files.

These and other features and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE DRAWING FIGURES

Figure 1:
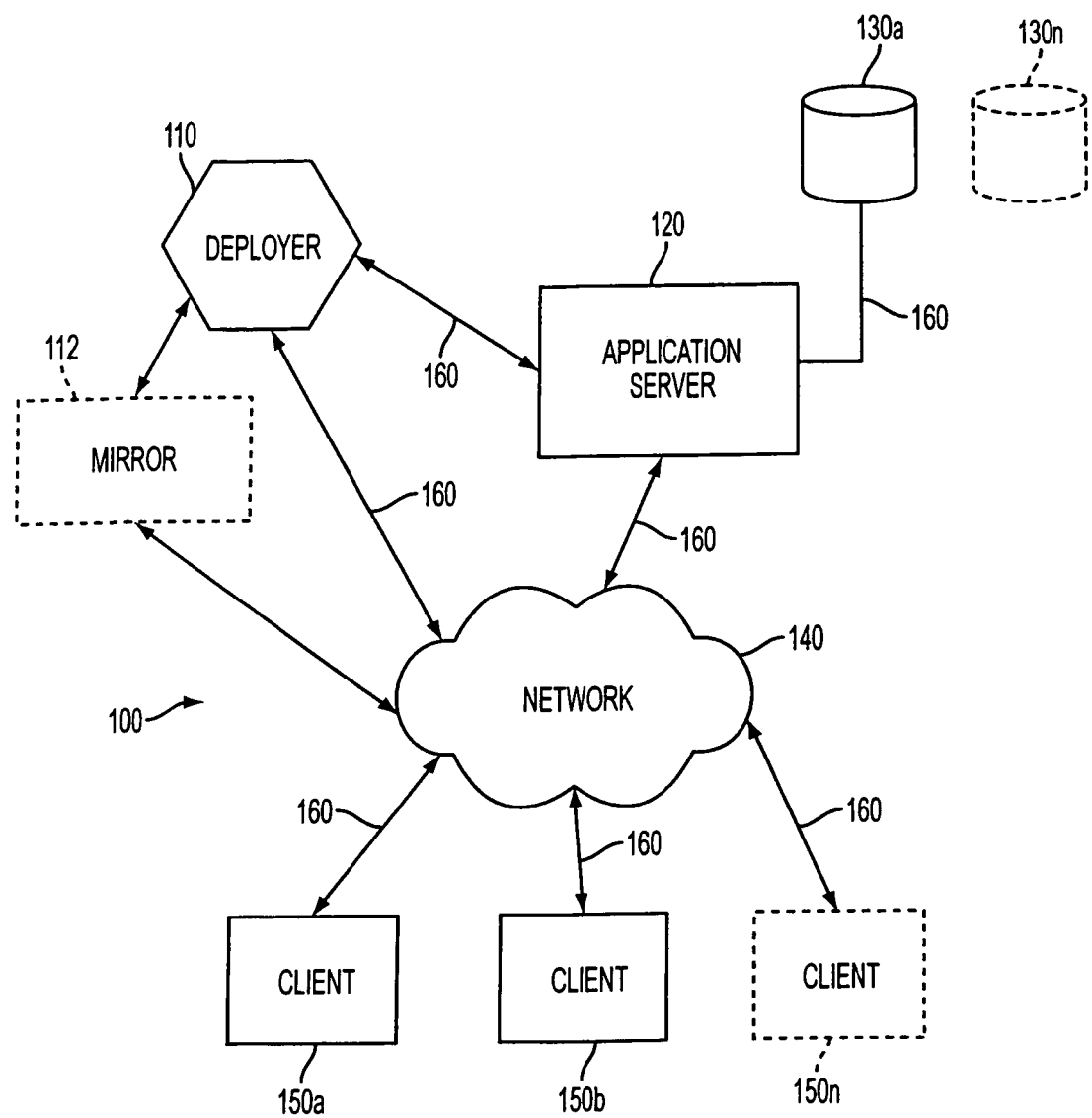
FIG. 1 is a schematic representation of the overall system 100 according to some embodiments of the invention.

FIG. 1 is a schematic representation of the overall system 100 according to some embodiments of the invention. The system may comprise a deployer 110 that functions as an execution agent as described herein. Deployer 110 may comprise a software module or other suitable processor readable agent that enables a processor to carry out the related functions.

Deployer 110 may communicate with other portions of system 100 via communication path 160. Communication path 160 may comprise any suitable signal carrying path. For example, communication path 160 may comprise a hard wired (e.g., cable) connection, a wireless (e.g., radio, satellite, cellular) connection, or some other suitable signal carrying path.

In some embodiments, Deployer 110 may communicate with a duplicate storage system or mirror 112. Mirror 112 may be a separate device (e.g., an additional server), in a separate location, or may comprise some other typical mirror server configuration.

System 100 may comprise at least one file server, such as application server 120. Application server 120 may comprise any suitable server or other mechanism for supplying files or services. For example, application server 120 may comprise a Java™ to platform enterprise edition (J2EE) web server, an IBM WebSphere™, BEA iPlanet™, IBM Domino™, or other suitable server.

Application server 120 may communicate (via a communication path 160) with appropriate system devices. For example, application server 120 may communicate with any number of storage devices 130a, 130n. Storage devices 130a, 130n may comprise databases or other file storage mechanisms. While storage devices 130a, 130n are shown in FIG. 1 as separate devices, the invention is not so limited. Storage devices 130a, 130n may comprise a portion of application server 120, a distributed network of storage devices, stand-alone storage devices, or some other storage arrangement.

Deployer 110, application server 120, mirror server 112, storage devices 130a, 130n and other system devices may communicate (e.g., via communication paths 160) directly with one another or over network 140. Network 140 may comprise any suitable network arrangement. For example, network 140 may comprise a local area network (LAN), a wide area network (WAN), a wireless network, an intranet, an extranet, the Internet, or some other suitable network configuration.

In addition, one or more client devices 150a, 150b, 150n may communicate over network 140. For example, client devices 150a, 150b, 150n may enable access to applications services by application server 120.

Figure 2:
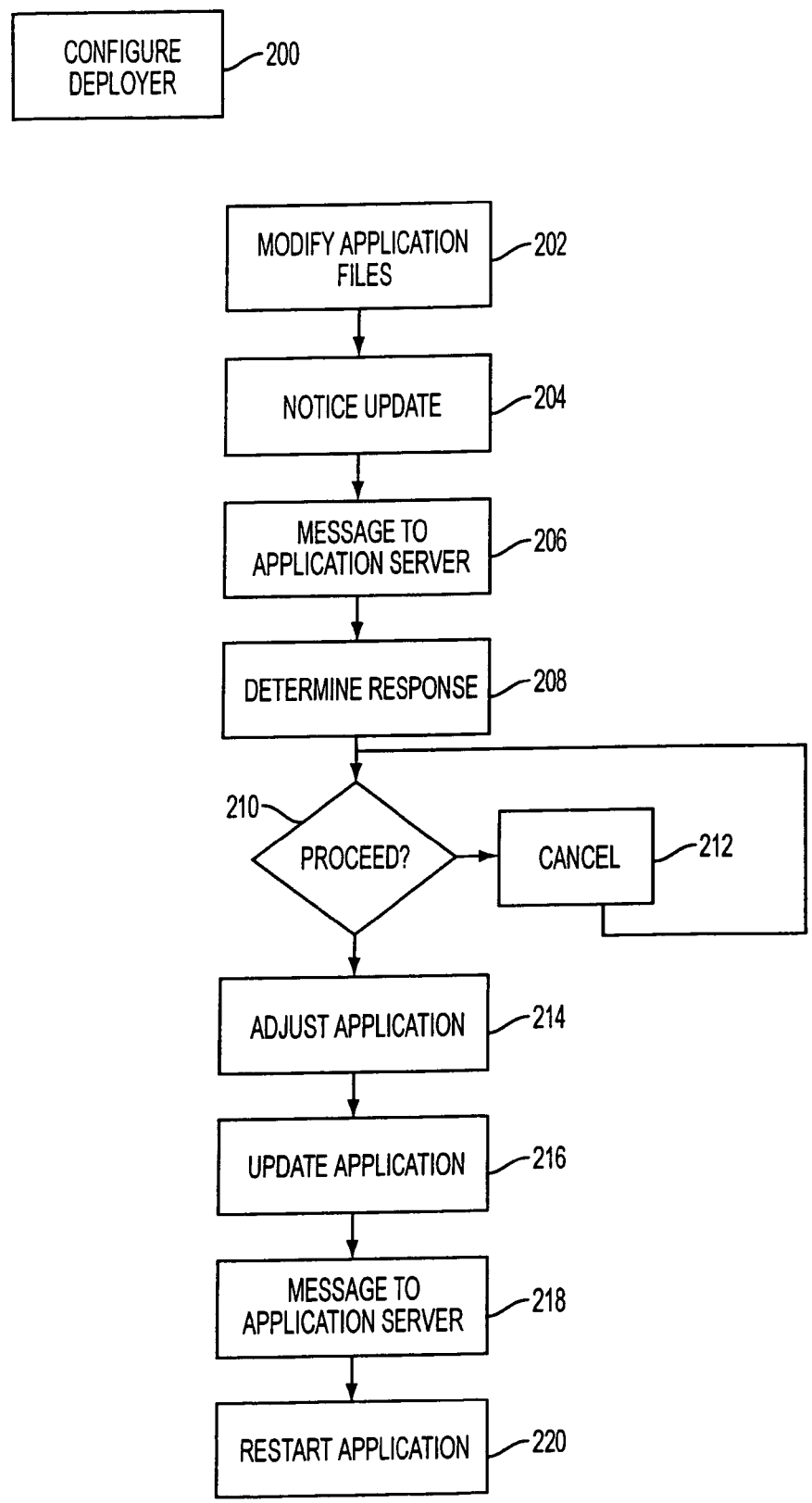
FIG. 2 is a schematic flow diagram illustrating a method of updating an application according to some embodiments of the invention.

FIG. 2 is a schematic flow diagram illustrating a method of updating an application according to some embodiments of the invention. The method shown in FIG. 2 is but one example of the inventive method. Other arrangements of the steps listed in FIG. 2 are possible.

At some time prior to initiating an update to an application, an administrator configures deployer 110 as shown in FIG. 2 at 200. Configuring deployer 110 may comprise any suitable method for setting predetermined criteria dictating when and how application server 120 should handle updates.

Any suitable criteria may be used to configure deployer 110. For example, criteria relating to the polling rate at which deployer 110 checks for updates, priority levels for the updates, time of day to deploy updates, changes in priority level based upon time of day, changes in priority level based upon type of application, and other criteria may be configured at step 200.

Configuration step 200 may also comprise setting a priority for which updates may occur. Priority may be established with any suitable level of granularity. For example, priority may be divided into high, medium and low priority levels. In addition, priority may be set according to application, time of day, number of users, number of active sessions, type of application, type of update (e.g., minimal or significant change), combinations of one or more of the foregoing, or other predetermined criteria.

In some embodiments, the configuration step 200 for deployer 110 may persist as long as desired. In this manner, an administrator need only perform configuration step 200 once if desired. Of course, configuration step 200 may also occur as often as desired.

When an update to an application is to occur, a developer or an administrator may make the modifications to the relevant application files as indicated at 202. Modification may occur in any suitable manner. For example, an application may be modified by modifying the application files in mirror server 112 or in application server 120 storage space (e.g., storage device 130a, 130n).

Deployer 110 may be configured to automatically notice that an update is available. Deployer 110 may notice that updates are available using any suitable method. For example, deployer 110 may periodically poll the applications in mirror 112 or storage devices 130a, 103n, to determine if file modification times have changed. Other schemes may also be used to determine when updates have occurred.

If deployer 110 configuration is so set, an update may initiate at 206 when deployer 110 sends a message to application server 120 to request an update for the modified application. The message to application server 120 may also comprise an indication of the priority level for the update.

Application server 120 examines the message and determines an appropriate response as indicated at 208. The response is a yes or no determination of whether to proceed with the update as indicated at 210 and may be based upon the priority set in deployer 110 configuration files.

For embodiments where application server 120 response is based upon update priority, any suitable predetermined response scheme may be implemented. For example, application server 120 may respond to a high priority message with a yes-proceed answer.

Medium priority update messages may receive a yes-proceed answer when certain criteria are satisfied. For example, a medium priority update may proceed when no users (e.g., clients 150a, 150b, 150n) have active sessions in the application. Other measures may also be implemented to insure that medium priority updates eventually proceed. For example, once a medium priority update request is received, application server 120 may refuse to accept new user sessions for the application; active users may continue to use the application, but new users are not allowed until the update is completed. Similarly, application server 120 may respond with a yes-proceed answer to low priority update messages when no active user sessions are present. Other application server 120 response schemes may also be used.

Application server 120 response may be determined as indicated at 210. If the determination at 210 is not to proceed, deployer 110 may cancel the update as indicated at 212. Deployer 110 may remember the failure to proceed and periodically retry the update request, as indicated in FIG. 2, or may implement some other procedure as dictated by deployer 110 configuration.

If the determination at 210 is to proceed, application the application or applications which are to be updated are adjusted as indicated at 214. Adjustment of the application or applications which are to be updated may occur in any suitable fashion as dictated by deployer 110 configuration. For example, as discussed above, proceeding with a high priority updates may cause application server 120 to halt the application; proceeding with medium priority updates may cause application server 120 to prevent new user sessions and halt the applications when the in-use sessions terminate; proceeding with low priority updates may cause application server to wait until no active sessions are present and then halt the applications. Other adjustments are possible.

The application update is implemented at 216. Implementation of the update may be accomplished in any suitable manner. For example, updated files on mirror server 112 or in application storage space (e.g., storage devices 130a, 130n) may be copied onto application server's 120 applications store. Other methods of implementing the update may also be used.

Deployer 110 may signal application server 120 to indicate that the update is complete as indicated at 218. Application server 120 may then restart the updated application as indicated at 220.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for coordinating updates to applications on a running application server without requiring a server restart, the system comprising:
   an application server that hosts one or more applications used by one or more clients;
   a deployer operatively coupled to the application server that coordinates timing and installation of an update to the one or more applications on the application server, the deployer further comprising:
   means for determining a priority associated with the update based on various priority criteria, the priority criteria including a type of application for which the application applies, and a magnitude of a change to the one or more applications made by the update; and
   means for controlling a timing of the installation of the update based on one or more installation criteria, the installation criteria comprising the determined priority associated with the update, and a number clients that have active sessions in the one or more applications.

2. The system of claim 1 further comprising:
   a duplicate application storage space that communicates with the deployer, wherein the update to the one or more applications is first performed on the duplicate application storage space.

3. The system of claim 2 wherein the duplicate application storage space is a mirror server.

4. The system of claim 1 wherein the priority criteria comprise a number of users and a time of day.

5. A method for updating one or more applications on an application server, wherein the one or more applications are used by one or more client devices, and wherein an update to the one or more applications are accomplished without the need for an application server restart, the method comprising:
- determining that the update is available for the one or more applications on the application server;
- signaling the application server that the update is available;
- determining a priority associated with the update, wherein the priority is based on various priority criteria, the priority criteria including a type of application for which the update applies, and a magnitude of the change to the one or more applications made by the update;
- determining a timing for proceeding with the update based on one or more installation criteria, the installation criteria comprising the determined priority associated with the update, and a number clients that have active sessions in the one or more applications, and in accordance with the determined timing for proceeding with the update;
- adjusting the one or more applications so that the update may proceed;
- updating the one or more applications; and
- signaling the application server when the update is complete.

6. The method of claim 5 wherein the step of determining a priority associated with the update further comprises:
- reading the priority assigned to the update by a deployer, wherein the priority criteria comprise a number of users and a time of day.

7. The method of claim 5 wherein determining that an update is available further comprises:
- polling a storage location to check for the presence of an update.

8. The method of claim 5 wherein the priority is one of a high, medium, or low priority.

9. The method of claim 8 wherein the priority is high and wherein adjusting the application so that the update may proceed further comprises:
- halting the application.

10. The method of claim 8 wherein the priority is medium and wherein adjusting the application so that the update may proceed further comprises:
- preventing access to the application by a client device that is not currently using the application; and
- halting the application when one or more client devices that are currently using the application terminate the application.

11. The method of claim 8 wherein the priority is low and wherein adjusting the application so that the update may proceed further comprises:
- halting the application when no client device is using the application.

12. A deployer operative on a computer system that coordinates an update to an application running on an application server wherein the application is used by one or more clients, the deployer comprising:
- means for determining a priority to the update based on various priority criteria, the priority criteria comprising a type of application for which the application applies, and a magnitude of the change to the one or more applications made by the update; and
- means for controlling a timing of the installation of the update based on one or more installation criteria, the installation criteria comprising the determined priority associated with the update, and a number clients that have active sessions in the one or more applications.

13. The deployer of claim 12 further comprising:
- a poller to poll a storage location and determine whether modified application files that correspond to an update to the application exist.

14. The deployer of claim 12 further comprising:
- a signaler to signal the application server when the update is complete.

15. A system for coordinating updates to one or more applications on a running application server without requiring a server restart, the system comprising:
- application server means for serving an application for one or more clients;
- deployer means for coordinating a timing and installation of an update to the one or more applications on the application server means, the deployer means further comprising:
  - means for determining a priority associated with the update based on various priority criteria, the priority criteria including a type of application for which the update applies, and a magnitude of a change to the one or more applications made by the update; and
  - means for controlling the timing of the installation of the update based on one or more installation criteria, the installation criteria comprising the determined priority associated with the update, and a number of clients that have active sessions in the one or more applications.

16. The system of claim 15 further comprising:
- duplicate application storage means for communicating with the deployer means, wherein the update to the one or more applications is first performed on the duplicate application storage means.

17. A processor readable medium, having processor readable code embodied thereon, that causes a processor to update one or more applications on an application server wherein the one or more applications are used by one or more client devices, and wherein an update to the one or more applications are accomplished without the need for an application server restart, the
processor readable medium comprising:
- processor readable code for determining an update is available for the one or more applications on the application server, and when an update is available:
- signaling the application server that the update is available;
- processor readable code for determining a priority associated with the update, wherein the priority is based on various priority criteria, the priority criteria including a type of application for which the update applies, and a magnitude of a change to the one or more applications made by the update;
- processor readable code for determining a timing for proceeding with the update based on one or more installation criteria, the installation criteria comprising the determined priority associated with the update, and a number clients that have active sessions in the one or more applications, and in accordance with the determined timing for proceeding with the update;
- processor readable code for adjusting the application so that the update may proceed;
- processor readable code for implementing the update to the application; and
- processor readable code for signaling the application server when the update is complete.

18. The processor readable medium of claim 17 wherein the processor readable code for determining a priority associated with the update further comprises:

processor readable code for reading the priority assigned to the update by a deployer, wherein the priority criteria comprise a number of users, and a time of day.

19. Deployer means operative on a computer system that coordinates an update to an application running on an application server wherein the application is used by one or more clients, the deployer means comprising:

configuration file means for assigning a priority to the update based on various priority criteria, the priority criteria including a type of application for the one or more applications, and a magnitude of a change to the one or more applications made by the update; and means for controlling a timing of the installation of the update based on one or more installation criteria, the installation criteria comprising the determined priority associated with the update, and a number clients that have active sessions in the one or more applications.

20. The deployer means of claim 19 further comprising:

polling means that polls a storage location and determines whether modified application files that correspond to an update to the application exist.

21. The deployer means of claim 19 further comprising:

signaling means for signaling the application server when the update is complete.

* * * * *